(No Model.)
W. M. HOLMES.
NEEDLE ARM FOR GRAIN BINDERS.
No. 406,908. Patented July 16, 1889.
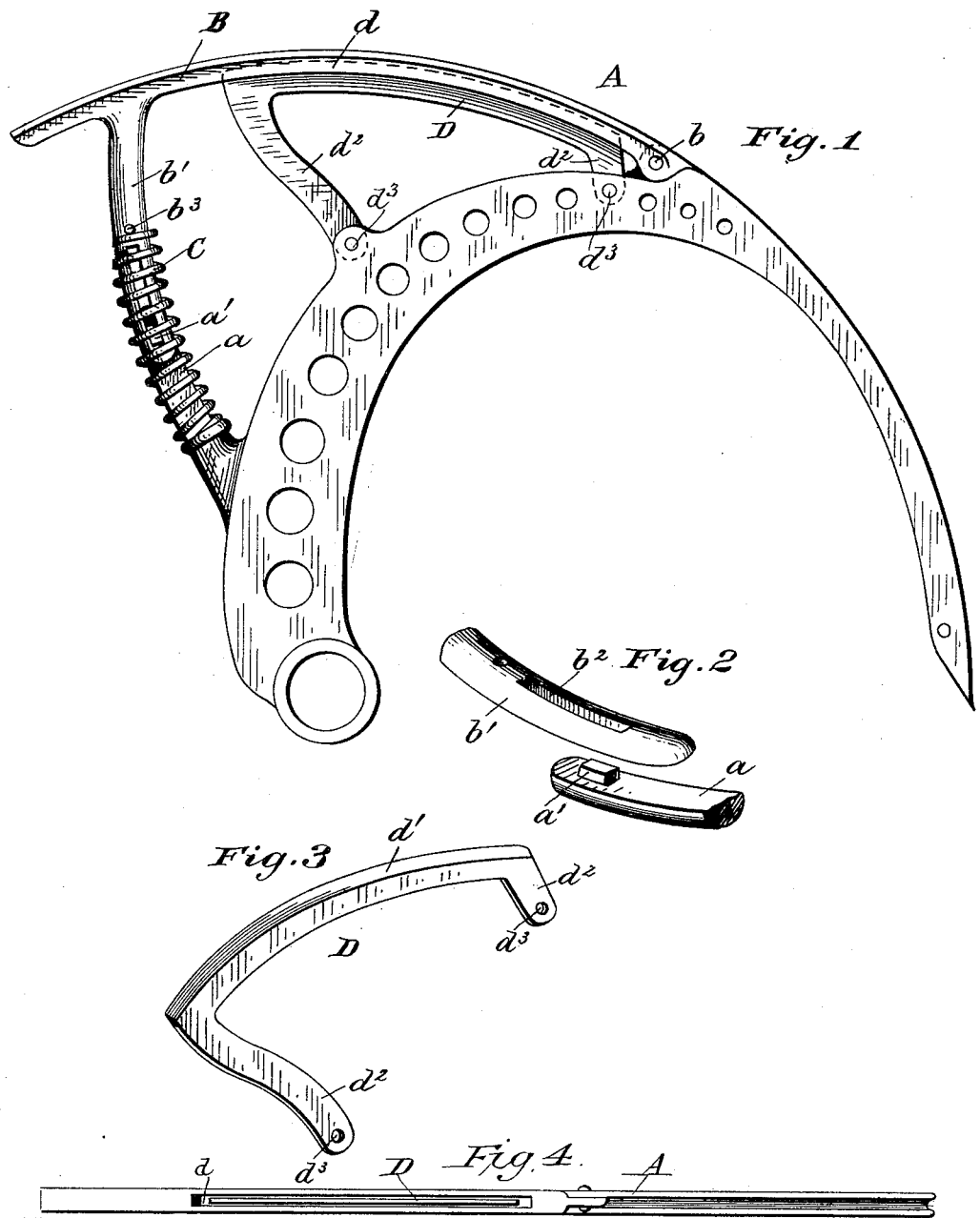
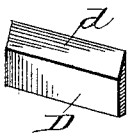
WITNESSES.
Walter W. Lovegrove
[signature]
INVENTOR.
Watson M. Holmes,
by Hinsdill Parsons,
ATTORNEY.
N. PETERS, Photo-Lithographer, Washington, D. C.

UNITED STATES PATENT OFFICE.

WATSON M. HOLMES, OF HOOSICK FALLS, NEW YORK.

NEEDLE-ARM FOR GRAIN-BINDERS.

SPECIFICATION forming part of Letters Patent No. 406,908, dated July 16, 1889.

Application filed January 11, 1889. Serial No. 296,091. (No model.)

*To all whom it may concern:*

Be it known that I, WATSON M. HOLMES, a citizen of the United States, residing at Hoosick Falls, county of Rensselaer, State of New York, have invented certain new and useful Improvements in Needle-Arms for Grain-Binders, of which the following is a full, clear, and exact description, reference being had to the accompanying drawings, forming a part of this specification.

It is desirable to construct the needle-arm of grain-binders with a wing on its rear side, in order to hold the grain back which is constantly being delivered into the binder by the harvester, so that the needle, after having placed the band around the bundle and into the knotter, may the more readily descend against the accumulated grain. The wing also insures a better separation of the bundle to be bound from the inflowing grain at the center of the bundle through the width which it adds to the needle-arm. It has been found that in harvesting certain conditions of crop the straws are so interwoven that the binder is choked by the needle-arm in its ascent through the crop of this nature and in separating the bundle to be bound from the inflowing grain.

My invention has for its object to overcome this difficulty; and to this end it consists in so combining with the needle and its wing a knife that the wing will, when a sufficient pressure is exerted thereon, yield to expose the knife, which will cut its way through the crop and insure a better separation of the bundle.

Referring to the accompanying drawings, Figure 1 is a side elevation of a needle-arm embodying my invention. Fig. 2 is a detail in perspective of the sliding connection between the needle and its wing. Fig. 3 is a perspective view of the knife. Fig. 4 is a plan view of the wing of the needle-arm, showing a slot in the latter and a knife resting therein.

A is the needle-arm, formed of the desired shape to impart the requisite contour to the bundle. The back side of the needle-arm is cast with a horn or projection $a$, which is semicircular, or nearly so, in cross-section, and on its flattened surface is formed a lug $a'$.

B is the wing of the needle-arm. It is secured to the needle-arm near its upper end by a pivot $b$, on which the wing is free to swing. The wing is also formed with an arm $b'$, semicircular in cross-section, in which is formed a longitudinal slot $b^2$, fitting over the lug $a'$. A spiral spring C, fitting over the semicircular projections $a$ $b'$, holds them together. The spring is compressed somewhat between the lower portion of the lug $a$ and a cotter $b^3$ in the arm $b'$. The upper curved portion of the wing B is slotted longitudinally at $d$, and within the slot is normally sheathed the knife-edge $d'$. The slot in the upper portion of the wing is sufficiently wide to allow the knife to be exposed by the yielding of the wing.

The knife D is formed with two arms $d^2$ $d^2$, which are firmly riveted to the needle-arm at $d^3$ $d^3$. The force of the spring C is sufficient to normally cause the pivoted wing B to sheathe the knife. In cutting heavy down-grain, however, the force exerted upon the wing is sufficient to overcome the tension of the spring as the needle ascends, and the wing B yields, exposing the knife, which cuts a passage-way through the matted crop. In cutting ordinary grain, which is straight and not matted or interwoven, the knife will not be exposed nor the straws cut.

Having now described my invention, what I claim as new, and desire to secure by Letters Patent, is—

1. The combination, with the needle-arm of an automatic grain-binder and a stationary knife attached to the back thereof, of a yielding wing pivoted to the needle-arm, substantially as and for the purpose specified.

2. The combination, with the needle-arm of an automatic grain-binder and a stationary knife attached to the back thereof, of a pivoted wing and a spring interposed between the wing and the needle-arm to normally hold the wing outwardly, so as to shield the knife, but adapted to yield upon undue pressure to expose the knife, substantially as and for the purpose specified.

3. The combination, with the needle-arm having the projection $a$, semicircular in cross-section, provided with lug $a'$, of the pivoted wing B, its slotted arm $b'$, semicircular in cross-section, the knife D, and the spiral spring C, substantially as and for the purpose specified.

4. The combination, with the slotted pivoted wing of the needle-arm and the stationary knife, of a spring to hold the wing to sheathe the knife, but adapted to be overcome by undue pressure upon the wing to expose the knife, substantially as and for the purpose specified.

In witness whereof I have hereunto set my hand this 6th day of November, 1888.

WATSON M. HOLMES.

Attest:
P. McKEARIN,
HINSDILL PARSONS.